Dec. 14, 1926.

J. POPPER 1,610,963

MULTIPLE PIE PLATE

Filed August 17, 1925

INVENTOR.
Joseph Popper
BY
ATTORNEY

Patented Dec. 14, 1926.

1,610,963

UNITED STATES PATENT OFFICE.

JOSEPH POPPER, OF BROOKLYN, NEW YORK.

MULTIPLE PIE PLATE.

Application filed August 17, 1925. Serial No. 50,582.

This invention relates to the art of pastry making, and particularly to improvements in pie baking plates, and it is the principal object of the invention to provide a pie plate allowing the simultaneous baking of a variety of pies.

Another object of the invention is the provision of a pie baking plate of simple and inexpensive construction, yet durable and efficient in operation.

A further object of the invention is the provision of a pie baking plate equipped with a partition, or partitions adapted to be clamped or secured to the pie plate and allowing the oven heat to be uniformly distributed.

These and other objects and advantages of the invention will become more fully known as the description thereof proceeds, and will then be specifically pointed out or defined in the appended claims.

In the accompanying drawing, forming a material part of this disclosure:

Figure 1:
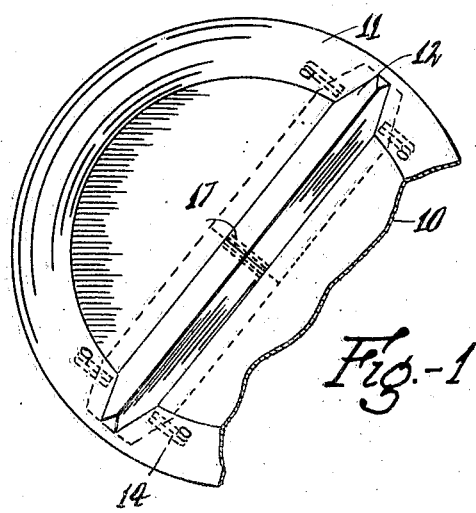
Fig. 1 is a fragmentary detail top plan view of a pie making plate constructed according to my invention.
Figure 5:
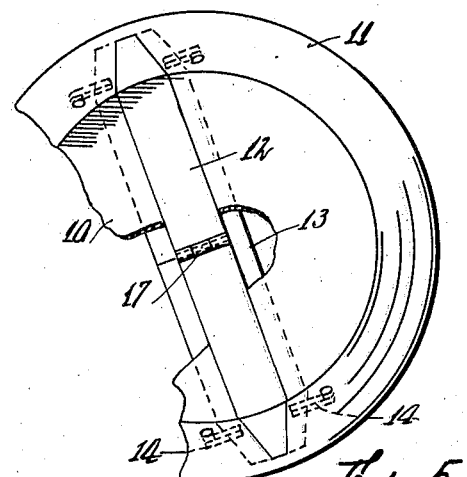
Fig. 5 is a fragmentary top plan view of a pie baking plate having part of its bottom broken away.
Figure 2:
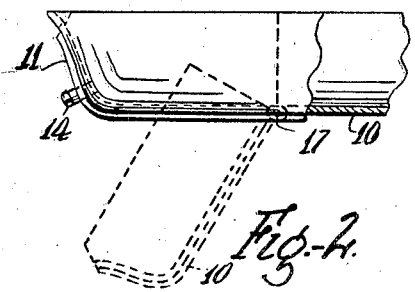
Fig. 2 is a fragmentary side elevation thereof.

The pie baking plate illustrated in Figures 1 to 5 comprises the usual plate 10 having a raised margin 11. On this plate a diametrically aligned partition 12 is provided comprising a substantially prismatic hollow body on a foot plate or flange 13 held against the outer bottom part of the pie plate by means of suitable clamps 14 near its ends pressing by means of their fingers 15, against the foot flange 13 while these fingers are frictionally and pivotally held at their other ends between suitably shaped lugs 16 on the pie plate.

The pie plate and partitions may be made in two parts hinged together, as at 17. The partitions 12 and their foot flanges 13 are not entirely adjacent and allow an unimpeded circulation of the oven heat to uniformly distribute the heat.

It will be clear that in this manner pies of different kinds may be baked in one plate, as for instance an apple pie may be baked on one side of the partition, while a peach or other pie may be baked on the opposite side of the partition.

Figure 6:
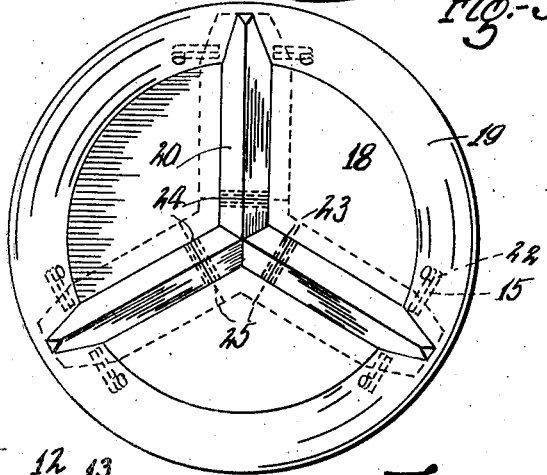
Fig. 6 is a top plan view of a modified form of pie baking plate.
Figure 3:
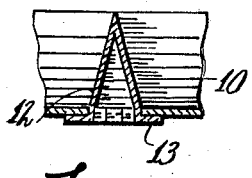
Fig. 3 is a fragmentary sectional end view of one of the partitions on an enlarged scale.
Figure 4:
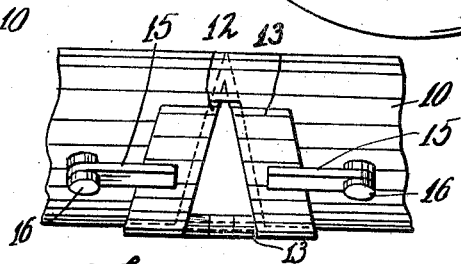
Fig. 4 is a fragmentary enlarged detail view of the partition securing means.

The modified form of pie plate 18 illustrated in Figure 6 shows a margin 19, and three hollow prismatic partitions 20 formed therewith, having foot flanges 21 held in place by clamps 22 of the same construction as described above with respect to the preferred form.

Also in this form the plate is made in parts hinged together as at 23, 24 and 25.

On this plate three different varieties of pies, as for instance lemon, mince and cherry pie, etc., may be baked simultaneously as will be evident.

While I have disclosed the preferred forms of my device as examples, it will be understood that such changes may be made in the construction of the minor details of my pie baking plate as come within the scope of the appended claims without departure from the spirit and scope of the invention.

Having thus described my invention, what I claim as new and desire to secure by Letters Patent, is:

1. A pie baking plate comprising a body having a diametrical elongated aperture, a partition formed by two inclined sides meeting at the top ends, and spaced apart thereafter, and provided with flanges along the bottom edges, said partition being removably engageable in said diametrical elongated aperture, and means depending from said body for clamping said partition to said body in engaged positions.

2. In a pie baking pan, a plate, a partition, a foot flange on said partition, and means for securing said foot flange to said plate, said means comprising a plurality of flange engaging fingers, and lugs on said plate to which the opposite ends of said fingers are pivotally and frictionally secured.

3. In a pie baking pan, a plate having an elongated aperture, a partition having a foot flange, and engageable in said aperture, and means for securing said partition to said plate, characterized by fingers frictionally and pivotally secured to said plate.

In testimony whereof I have affixed my signature.

JOSEPH POPPER.